United States Patent
Dudar et al.

(10) Patent No.: US 12,509,083 B2
(45) Date of Patent: Dec. 30, 2025

(54) SYSTEM AND METHOD FOR NAVIGATING CURVY ROADS

(71) Applicant: Ford Global Technologies, LLC, Dearborn, MI (US)

(72) Inventors: Aed Dudar, Canton, MI (US); Mahmoud Ghannam, Canton, MI (US)

( * ) Notice: Subject to any disclaimer, the term of this patent is extended or adjusted under 35 U.S.C. 154(b) by 254 days.

(21) Appl. No.: 18/167,824

(22) Filed: Feb. 10, 2023

(65) Prior Publication Data
US 2024/0270252 A1    Aug. 15, 2024

(51) Int. Cl.
*B60W 30/18* (2012.01)
*B60W 10/08* (2006.01)
*B60W 10/20* (2006.01)

(52) U.S. Cl.
CPC ...... *B60W 30/18145* (2013.01); *B60W 10/08* (2013.01); *B60W 10/20* (2013.01); *B60W 2520/10* (2013.01); *B60W 2520/30* (2013.01); *B60W 2530/10* (2013.01); *B60W 2552/30* (2020.02); *B60W 2552/40* (2020.02);
(Continued)

(58) Field of Classification Search
CPC ........... B60W 30/18145; B60W 10/20; B60W 2556/45; B60W 2556/50; B60W 2556/55; B60W 2552/05; B60W 2552/15; B60W 2552/20; B60W 2552/25; B60W 2552/30; B60W 2552/35; B60W 2552/40; B60W 2552/53; B60W 40/02; B60W 40/06; B60W 40/064; B60W 40/068; B60W 40/072; B60W 40/076; B60W 10/08; B60W 2556/40; B60W 2555/20; B60W 2520/10; B60W 2520/30; B60W 2530/10;
(Continued)

(56) References Cited

U.S. PATENT DOCUMENTS

| 5,229,941 A | 7/1993 | Hattori |
| 7,400,963 B2 | 7/2008 | Lee et al. |

(Continued)

FOREIGN PATENT DOCUMENTS

JP    3133770 B2 *    2/2001    ......... B60K 31/0058

OTHER PUBLICATIONS

Yunwu Li et al., Autonomous Navigation and Path Tracking Control on Field Roads in Hilly Areas, Hindawi, Journal of Sensors, vol. 2019, Article ID 6738594, Nov. 25, 2019, 1-15.

*Primary Examiner* — Ramya P Burgess
*Assistant Examiner* — Sara J Lewandroski
(74) *Attorney, Agent, or Firm* — Frank Lollo; Eversheds Sutherland (US) LLP

(57) ABSTRACT

A vehicle including a transceiver, a wheel drive motor and a processor is disclosed. The transceiver may be configured to receive road information and weather information, and the wheel drive motor may be configured to control torque of a vehicle wheel. The processor may be configured to receive a trigger signal when the vehicle approaches a curvy road. The processor may be further configured to obtain the road information and the weather information from the transceiver responsive to obtaining the trigger signal. The road information may include radius of curvature of the curvy road. The processor may calculate a vehicle speed based on the obtained road information and the weather information. The processor may further transmit a command signal to the wheel drive motor to vehicle wheel control torque based on the vehicle speed.

20 Claims, 5 Drawing Sheets

(52) U.S. Cl.
CPC ..... *B60W 2555/20* (2020.02); *B60W 2556/50* (2020.02); *B60W 2710/083* (2013.01); *B60W 2710/207* (2013.01); *B60W 2720/30* (2013.01)

(58) Field of Classification Search
CPC ..... B60W 2710/083; B60W 2710/207; B60W 2720/30
See application file for complete search history.

(56) References Cited

U.S. PATENT DOCUMENTS

| | | | |
|---|---|---|---|
| 7,774,121 B2* | 8/2010 | Lee .................... | B60W 30/143 701/93 |
| 10,203,031 B2 | 2/2019 | Gauthier | |
| 10,337,874 B2 | 7/2019 | Nagy et al. | |
| 2008/0059036 A1* | 3/2008 | Imai .................... | B60W 30/143 701/93 |
| 2010/0100267 A1* | 4/2010 | Morichika ............. | B61B 10/04 701/23 |
| 2013/0024048 A1* | 1/2013 | Auvinet .............. | B60T 8/17555 701/1 |
| 2015/0151756 A1* | 6/2015 | Han ................. | B60W 30/18145 701/93 |
| 2017/0032480 A1* | 2/2017 | Wong ........................ | G06N 5/04 |
| 2018/0022382 A1* | 1/2018 | Akatsuka ............... | B62D 6/003 701/41 |
| 2018/0164111 A1* | 6/2018 | Jung ........................ | G08G 1/01 |
| 2020/0139971 A1* | 5/2020 | Bucht ............. | B60W 30/18145 |
| 2020/0180622 A1* | 6/2020 | Hosokawa ...... | B60W 30/18145 |
| 2021/0046951 A1 | 2/2021 | Kim | |
| 2022/0121213 A1* | 4/2022 | Hsu ................. | B60W 30/18154 |
| 2022/0266709 A1* | 8/2022 | Hinata .................... | B60R 11/02 |
| 2022/0340132 A1* | 10/2022 | Eriksson ............... | B60W 50/10 |
| 2022/0388516 A1* | 12/2022 | Laruelo ............... | G01C 21/3461 |
| 2023/0095869 A1* | 3/2023 | Kubatzki .............. | B60W 30/16 701/96 |
| 2023/0398980 A1* | 12/2023 | Horiguchi ........... | B60D 50/087 |
| 2024/0174231 A1* | 5/2024 | Boronka ............... | B60W 30/146 |

* cited by examiner

SYSTEM AND METHOD FOR NAVIGATING CURVY ROADS

FIELD

The present disclosure relates to systems and methods for navigating curvy roads and more particularly to systems and methods for controlling vehicle movement on curvy roads based on road information and weather information.

BACKGROUND

Driving a vehicle on curvy or windy roads may be inconvenient to a vehicle user. The user may be required to perform multiple lateral vehicle movements, apply brakes multiple times, and control steering rotations to maneuver road curvatures. Inclement weather may further increase user inconvenience while driving, especially if the road is wet or has snow.

There exist driving assist systems that facilitate users to drive in lanes on curvy roads. However, there may be instances where the lanes may not be visible on the road. For example, the lanes may not be visible when the road may be covered with snow or water. The lanes may also fade with time due to wear and tear. Convention driving assist systems may not assist users in such scenarios.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
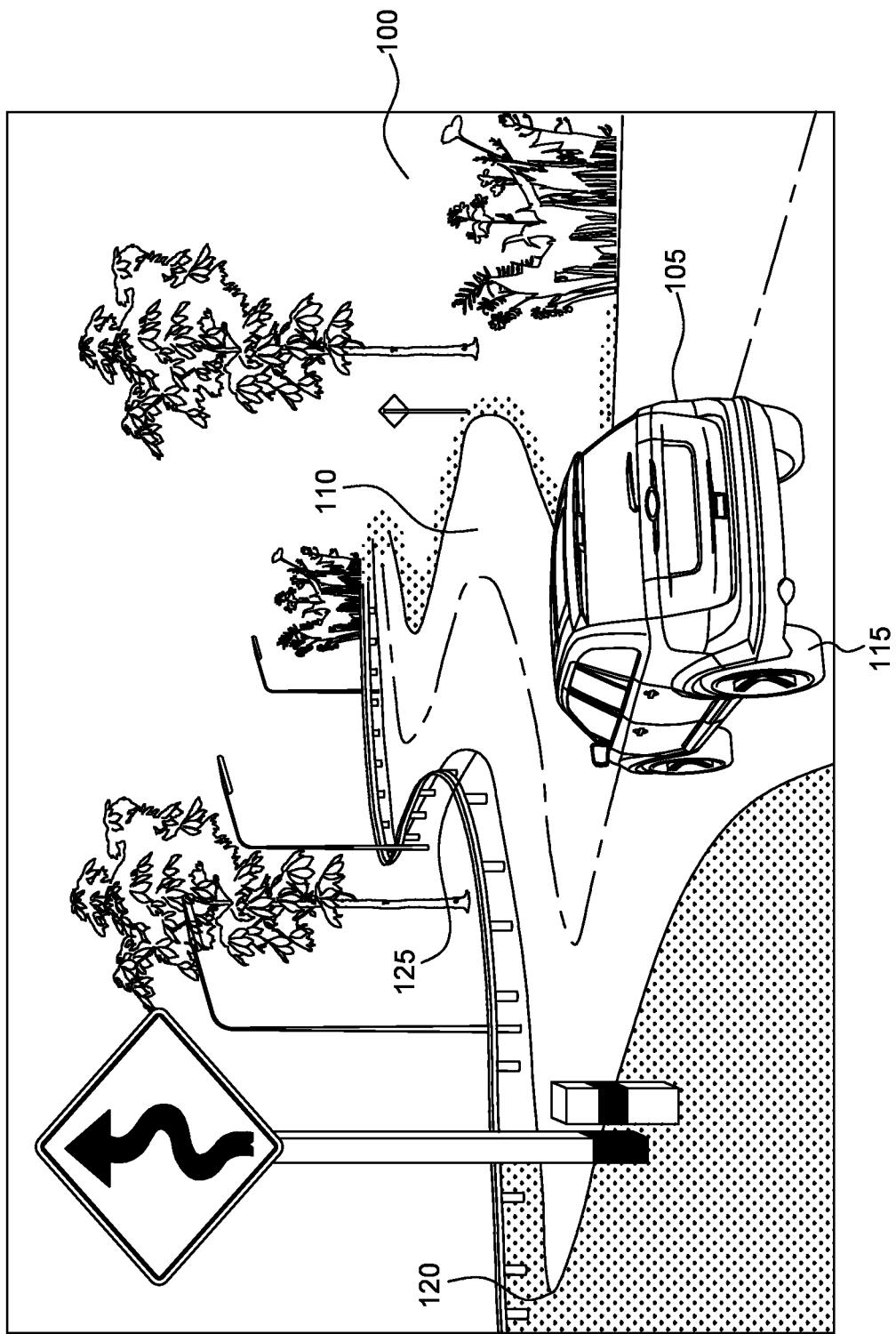
FIG. 1 depicts an example environment in which techniques and structures for providing the systems and methods disclosed herein may be implemented.

The present disclosure describes a system and method for controlling movement of a vehicle on a curvy road. In some instances, the vehicle may be an Electric Vehicle (EV) having a drive motor and a steering actuator associated with each wheel. Any suitable vehicle may be used herein. Each wheel may be configured to move with a torque and/or a rotation angle independent of torque and rotation angles of other wheels. The system may be configured to control operation of the drive motor and the steering actuator to enable the vehicle to stably navigate the curvy road.

In some aspects, the system may receive a trigger signal when the vehicle approaches the curvy road. The system may receive the trigger signal from, for example, a Global Positioning System (GPS) server, or a vehicle operator via a user device or a vehicle Human-Machine Interface (HMI). Responsive to receiving the trigger signal, the system may obtain road information and weather information. The road information may include, for example, radius of curvature of curves on the curvy road, and the weather information may indicate presence (or absence) of rain, snow, etc. in a geographical area including the curvy road. The system may calculate an optimum vehicle speed based on the obtained road information and the weather information. Responsive to calculating the optimum vehicle speed, the system may transmit a first command signal to the drive motor to control wheel torque so that the vehicle may move at the optimum vehicle speed on the curvy road. In some aspects, the system may enable the vehicle operator to modify (e.g., increase) vehicle speed when the vehicle crosses the curvy road.

In additional aspects, the system may obtain vehicle information including vehicle design, wheel condition information, vehicle weight, etc. The system may calculate an optimum rotation angle for each wheel based on the obtained vehicle information and the road information (e.g., radius of curvature). The optimum rotation angle may be same or different for each wheel. Responsive to calculating the optimum rotation angle, the system may transmit a second command signal to the steering actuator to control rotation angle of each wheel based on the optimum rotation angle.

In further aspects, the system may transmit the obtained road information and the weather information, and the calculated optimum vehicle speed and wheel rotation angle to an external server (e.g., cloud) for storage purpose. In further aspects, the system may store the obtained road information and the weather information, and the calculated optimum vehicle speed and wheel rotation angle in a system memory. The system may use the stored information and an Artificial Intelligence/Machine Learning (AI/ML) algorithm to assist the vehicle (or any other similar vehicle) in navigating the curvy road when the vehicle navigates the same road with similar weather condition. Specifically, when the system determines that the vehicle may be navigating the same curvy road (e.g., based on historical driving pattern information associated with the vehicle or vehicle geolocation information) with similar weather condition, the system may control the vehicle speed and the wheel rotation angle based on the stored information, and may not calculate optimum vehicle speed/wheel rotation angle again. This way, the system may save computational resources, and may "re-use" stored information if the road and the weather condition are same or similar as earlier trips of the vehicle. Further, in this case, if the weather condition is different from earlier trips, the system may "re-calculate" the optimum vehicle speed and wheel rotation angle by updating only the weather condition in the stored information.

The present disclosure discloses a system and method for controlling vehicle movement on a curvy road. The system automatically controls vehicle speed so that the vehicle may stably navigate the curvy road. In this manner, the vehicle operator may not be required to manually control the vehicle speed at each curve. The system may further automatically control rotation angle of each wheel, thus eliminating a need for the vehicle operator to manually control vehicle rotation. The system factors-in weather information while calculating the optimum vehicle speed and the rotation angle of each wheel, thus providing accurate and effective drive assistance to the vehicle operator on the curvy road.

The other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 travelling on a curvy or windy road 110. The vehicle 105 may be a Battery Electric Vehicle (BEV), and may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode.

The vehicle 105 may have four wheels (collectively referred to as wheels 115), and the vehicle 105 may be configured to independently control movement of each wheel 115. Each wheel 115 may have its own independent drive motor (shown as wheel drive motor 242 in FIG. 2) and steering actuator (shown as wheel steering actuator 244 in FIG. 2) that may enable the vehicle 105 to independently control torque, torque polarity, and rotation angle of each wheel 115.

Each wheel 115 may be configured to move independently of other vehicle wheels by using respective drive motor and steering actuator. For example, left vehicle wheel may be configured to move with a different torque and rotation angle than torque and rotation angle of right vehicle wheel. In some aspects, a drive motor may be configured to activate wheel movement (e.g., movement in forward or backward direction) and control wheel torque (or speed) and torque polarity. A steering actuator may control wheel rotation angle. Independent movement control of each wheel 115 may enable a vehicle operator or a vehicle drive assist system (shown as vehicle drive assist system 208 in FIG. 2) to conveniently navigate road 110 curvatures.

The vehicle drive assist system ("system") may include components disposed onboard the vehicle 105 (e.g., as part of on-board vehicle computer) and may be configured to assist the vehicle operator to navigate the road 110 by using road information and ambient weather information. In particular, the system may communicatively connect with one or more servers (shown as servers 220 in FIG. 2) that may provide the road information and the weather information to the system. The system may also obtain some parts of the road information and/or the weather information from vehicle sensors (e.g., vehicle ambient weather sensors, vehicle cameras, etc.).

The road information may include, for example, radius of curvature of each curve on the road 110, road surface type (e.g., asphalt surface, concrete surface, etc.), road inclination angle (e.g., whether the road 110 is an upgraded road, a downgraded road, or a level road), road condition information (e.g., freshly laid road or road with wear and tear), and/or the like. The system may receive the road information from a Global Positioning System (GPS) server or a server that may dedicatedly store and provide road information.

The weather information may include, for example, ambient temperature, presence of rain, snow, etc., time duration for which it may have been raining/snowing, wind speed, and/or the like. The system may receive the weather information a third-party server that may dedicatedly store and provide weather information.

The system may assist the vehicle operator in navigating the road 110 when the vehicle 105 approaches a curve (e.g., a curve 120) on the road 110. Specifically, when the vehicle 105 approaches (or is approaching) the curve 120, the system may determine an optimum vehicle speed based on the received road information and the weather information so that the vehicle 105 may conveniently navigate the curve 120, without skidding or crossing a lane on the road 110. The system may then automatically modify an existing vehicle speed at which the vehicle 105 may be travelling, and cause the vehicle 105 to move at the determined optimum vehicle speed. In some aspects, the system may send command signals (e.g., first command signals) to respective drive motor of each wheel 115 to modify the vehicle 105 speed to the optimum vehicle speed. For example, if the vehicle 105 may be travelling at a speed of 45 miles per hour before the vehicle 105 approaches the curve 120, and the system calculates the optimum vehicle speed to be 30 miles per hour based on the road information and the weather information, the system may send command signals to the respective drive motors to reduce speed of each wheel 115 so that the vehicle 105 may move at a speed of 30 miles per hour.

In some aspects, the system may allow the vehicle operator to increase vehicle 105 speed after the vehicle 105 crosses the curve 120. The system may repeat the same operation (i.e., calculate an optimum vehicle speed and modify existing vehicle speed) when the vehicle 105 approaches another curve (e.g., a curve 125) on the road 110. In some aspects, the system may "take control" of the vehicle 105 from the vehicle operator when the vehicle 105 approaches the curve 120/125, and may give vehicle control back to the vehicle operator when the vehicle 105 cross the curve 120/125. In other aspects, the system may give the vehicle control back to the vehicle operator when the vehicle crosses the road 110.

In additional aspects, the system may control rotation angle of each wheel 115 when the vehicle 105 navigates the curve 120. Specifically, when the vehicle 105 approaches the curve 120, along with determining the optimum vehicle speed, the system may determine an optimum rotation angle for each wheel 115 based on the received road information (e.g., curve 120 radius of curvature) and vehicle information. In this case, the system may receive the vehicle information from vehicle memory or system memory (shown as memory 218, 250 in FIG. 2). The vehicle information may include, for example, vehicle weight, vehicle wheel condition information, vehicle structure information (e.g., vehicle length and width), historical vehicle driving or usage pattern, and/or the like.

Responsive to determining the optimum rotation angle for each wheel 115, the system may send command signals (e.g., second command signals) to each steering actuator to control rotation angle for each wheel 115 based on the determined optimum rotation angle.

In additional aspects, the system may transmit the calculated optimum vehicle speed and wheel rotation angle to an external server (e.g., cloud) for storage purpose. In further aspects, the system may store the calculated optimum vehicle speed and wheel rotation angle in the system memory. The system memory and the external server may also store the road information and the weather information obtained by the system. The system may "re-use" the stored vehicle speed and wheel rotation angle on a future vehicle trip, when the system determines that the vehicle 105 may be travelling on the same road 110 in the future vehicle trip, and the weather condition may be same as earlier trip associated with the vehicle 105. The system may determine that the vehicle 105 may be travelling on the same road 110 based on the real-time road information obtained by the system or vehicle geo-location, and/or the historical vehicle driving or usage pattern. In this case, the system may save computational resources by "re-using" stored vehicle speed and wheel rotation angle, if the weather condition is similar to earlier trips. In case the weather condition is different from earlier trips, the system may update the stored vehicle speed and wheel rotation angle by using updated weather information.

The external server (e.g., cloud) may also share the stored vehicle speed and wheel rotation angle to other vehicles, so that the other vehicles may also use the vehicle speed and wheel rotation angle if the vehicles navigate the same road 110 in similar weather conditions.

Figure 2:
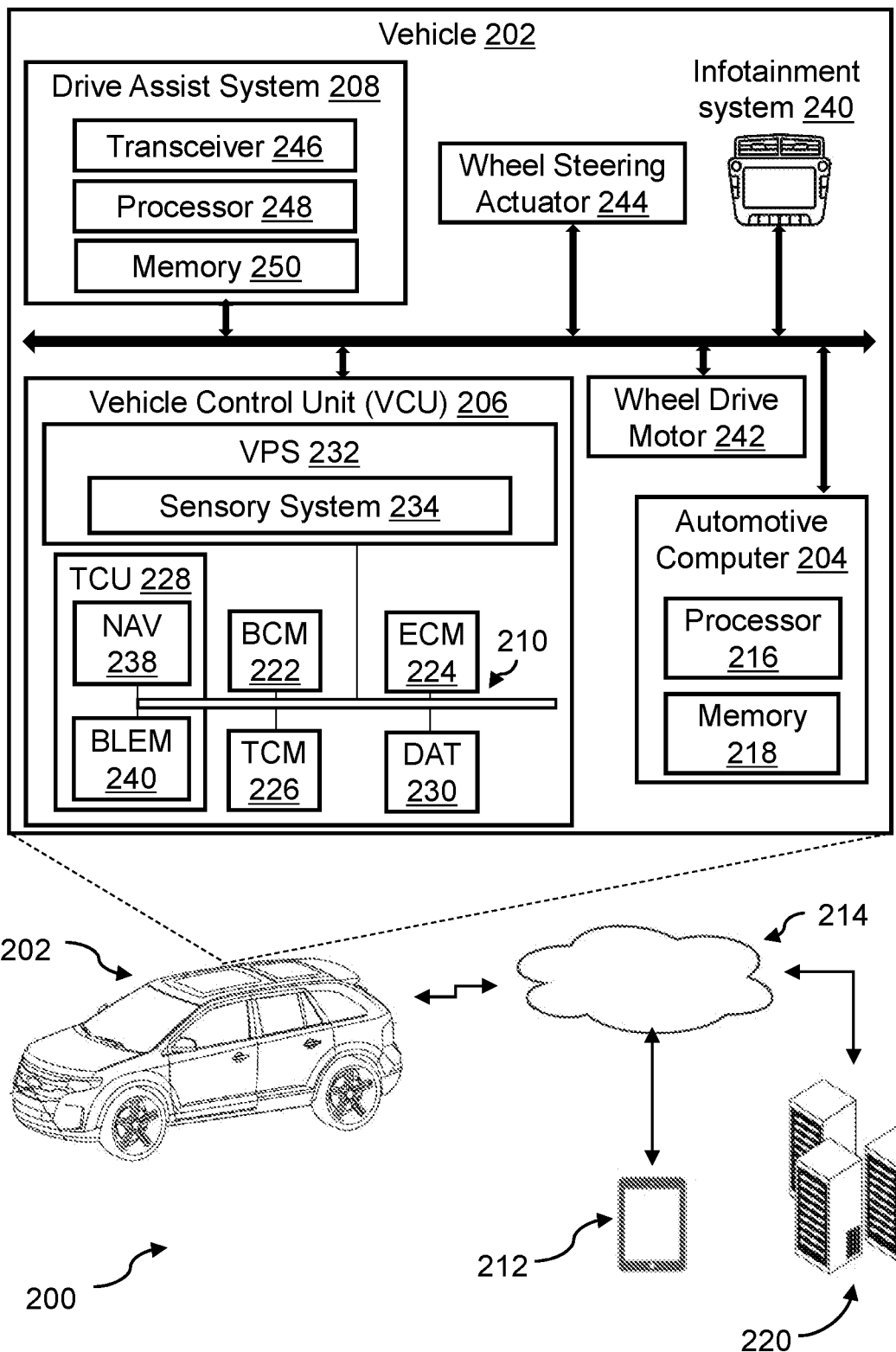
FIG. 2 illustrates a block diagram of an example system for navigating curvy or windy roads, in accordance with the present disclosure.

The system and the process of controlling vehicle speed and rotation angle of each wheel 115 may be understood in detail in conjunction with FIG. 2.

FIG. 2 illustrates a block diagram of an example system 200 for navigating curvy or windy roads (e.g., the road 110), in accordance with the present disclosure. While describing FIG. 2, references may be made to FIG. 3.

The system 200 may include a vehicle 202, which may be same as the vehicle 105. The vehicle 202 may include an automotive computer 204, a Vehicle Control Unit (VCU) 206, and a driving assist system 208 (same as the driving assist system described in conjunction with FIG. 1). The VCU 206 may include a plurality of Electronic Control Units (ECUs) 210 disposed in communication with the automotive computer 204.

The system 200 may further include a mobile device 212 that may connect with the automotive computer 204 and/or the driving assist system 208 by using wired and/or wireless communication protocols and transceivers. In some aspects, the mobile device 212 may be associated with a vehicle user/operator (not shown). The mobile device 212 may communicatively couple with the vehicle 202 via one or more network(s) 214, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

The network(s) 214 illustrates an example communication infrastructure in which the connected devices discussed in various embodiments of this disclosure may communicate. The network(s) 214 may be and/or include the Internet, a private network, public network or other configuration that operates using any one or more known communication protocols such as, for example, transmission control protocol/Internet protocol (TCP/IP), Bluetooth®, BLER, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the driving assist system 208 may be installed in a vehicle engine compartment (or elsewhere in the vehicle 202), in accordance with the disclosure. Further, the automotive computer 204 may operate as a functional part of the driving assist system 208. The automotive computer 204 may be or include an electronic vehicle controller, having one or more processor(s) 216 and a memory 218. Moreover, the driving assist system 208 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a driving assistance program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the automotive computer 204 and/or the driving assist system 208 may be disposed in communication with one or more server(s) 220 and the mobile device 212 via the network 214. In some aspects, the server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In other aspects, the server(s) 220 may be associated with Global Positioning System (GPS), and may provide road information described above in conjunction with FIG. 1 to the automotive computer 204 and/or the driving assist system 208 (e.g., via the VCU 206). In yet another aspect, the server(s) 220 may be a server configured to store and provide weather information in a geographical area including the road 110. In this case, the server(s) 220 may provide weather information described in conjunction with FIG. 1 to the automotive computer 204 and/or the driving assist system 208.

In accordance with some aspects, the VCU 206 may share a power bus with the automotive computer 204 and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 210, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, weight sensors, ambient weather sensors, vehicle wheel sensors, vehicle internal or external cameras, etc. In some aspects, the ambient weather sensors may be configured to determine an environmental weather condition proximate to the vehicle 202, and/or at one or more waypoints of a vehicle travel path. Further, the vehicle wheel sensors may be configured to determine wheel information associated with each wheel 115, for example, wheel pressure, wheel condition information (e.g., whether the wheel 115 is new or worn due to wear and tear), etc.

In some aspects, the VCU 206 may control vehicle 202 operational aspects and implement one or more instruction sets received from the mobile device 212, from one or more instruction sets stored in computer memory 218 of the automotive computer 204, including instructions operational as part of the driving assist system 208.

The TCU 228 can be configured and/or programmed to provide vehicle connectivity to wireless computing systems onboard and off board the vehicle 202, and may include a Navigation (NAV) receiver 236 for receiving and processing a GPS signal, a BLER Module (BLEM) 238, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 210 by way of a bus.

The ECUs 210 may control aspects of vehicle operation and communication using inputs from human drivers, inputs from an autonomous vehicle controller, the driving assist system 208, and/or via wireless signal inputs received via the wireless connection(s) from other connected devices, such as the mobile device 212, the server(s) 220, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 204 may connect with an infotainment system 240 that may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications, navigation maps, etc. on the touchscreen interface portion.

The computing system architecture of the automotive computer 204, the VCU 206, and/or the driving assist system 208 may omit certain computing modules. It should be readily understood that the computing environment depicted in FIG. 2 is an example of a possible implementation according to the present disclosure, and thus, it should not be considered limiting or exclusive.

The vehicle 202 may further include a wheel drive motor 242 and a wheel steering actuator 244. As described in conjunction with FIG. 1, each wheel 115 may have its own independent drive motor and steering actuator. Consequently, although FIG. 2 depicts a single wheel drive motor 242 and a single wheel steering actuator 244, the vehicle 202 may include four wheel drive motors and four wheel steering actuators if the vehicle 202 has four wheels.

The wheel drive motor 242 may be configured to activate wheel 115 movement and control wheel 115 torque (or speed) and torque polarity based on inputs received from the drive assist system 208. Similarly, the wheel steering actuator 244 may be configured to control wheel 115 rotation angle based on inputs received from the drive assist system 208.

In accordance with some aspects, the drive assist system 208 may be integrated with and/or executed as part of the ECUs 210. The drive assist system 208, regardless of whether it is integrated with the automotive computer 204 or the ECUs 210, or whether it operates as an independent computing system in the vehicle 202, may include a transceiver 246, a processor 248, and a computer-readable memory 250.

The transceiver 246 may be configured to receive information/inputs from one or more external devices or systems, e.g., the mobile device 212, the server(s) 220, and/or the like via the network 214. For example, the transceiver 246 may be configured to receive the road information and the weather information from the server(s) 220 via the network 214. Further, the transceiver 246 may transmit notifications (e.g., alert/alarm signals) to the external devices or systems. In addition, the transceiver 246 may be configured to receive information/inputs from vehicle 202 components such as the infotainment system 240, the vehicle sensory system 234, and/or the like. Further, the transceiver 246 may transmit notifications (e.g., alert/alarm signals) to the vehicle 202 components such as the infotainment system 240.

The processor 248 and the memory 250 may be same as or similar to the processor 216 and the memory 218, respectively. Specifically, the processor 248 may utilize the memory 250 to store programs in code and/or to store data for performing aspects in accordance with the disclosure. The memory 250 may be a non-transitory computer-readable memory storing the driving assistance program code. In some aspects, the memory 250 may additionally store information associated with the vehicle 202 and one or more sensory inputs received from the sensory system 234 (e.g., inputs received from weight sensors, vehicle wheel sensors, etc.) as "vehicle information". As described in conjunction with FIG. 1, the vehicle information may include, for example, vehicle weight (including weight of passengers and/or cargo), vehicle wheel condition information, vehicle structure information (e.g., design of vehicle, type of vehicle wheels), and/or the like. In additional aspects, the memory 250 may store historical vehicle driving or usage pattern including, for example, roads travelled by the vehicle 202 frequently, driving time durations, associated vehicle speeds, wheel rotation angles, etc.

In operation, the transceiver 246 may receive a first trigger signal when the vehicle 202 approaches the road 110 including one or more curves (e.g., the curves 120, 125). The first trigger signal may include instructions to "activate" the drive assist system 208. The transceiver 246 may receive the first trigger signal from the vehicle operator, via the mobile device 212 or the infotainment system 240. In other aspects, the transceiver 246 may receive the first trigger signal from a vehicle camera (e.g., exterior vehicle camera), the vehicle sensory system 234, or based on vehicle GPS location (e.g., obtained from the server(s) 220 and the TCU 228), when the vehicle 202 approaches the road 110 (or is in proximity to the road 110).

Responsive to receiving the first trigger signal, the transceiver 246 may send the first trigger signal to the processor 248, and the processor 248 may "activate" the drive assist system 208 responsive to receiving the first trigger signal. In some aspects, the transceiver 246 may obtain the road information and the weather information from the server(s) 220 when the processor 248 activates the drive assist system 208. The transceiver 246 may also receive real-time vehicle 202 geolocation from the TCU 228 when the processor 248 activates the drive assist system 208. The transceiver 246 may receive the road information, the weather information, and the real-time vehicle 202 geolocation post activation of the drive assist system 208 at a predefined frequency, e.g., every 10-50 milliseconds.

The transceiver 246 may send the received real-time vehicle 202 geolocation to the processor 248. Responsive to obtaining the real-time vehicle 202 geolocation, the processor 248 may determine that the vehicle 202 may be approaching the curve 120 based on the real-time vehicle 202 geolocation obtained from the server(s) 220. Stated another way, the processor 248 may track the real-time vehicle 202 geolocation and may determine that the vehicle 202 may be approaching the curve 120. For example, the processor 248 may obtain a second trigger signal from the server(s) 220 (e.g., via the TCU 228) when GPS signal indicates that the curve 120 has arrived, and determine that the vehicle 202 may be approaching the curve 120 based on the second trigger signal.

Responsive to determining that the vehicle 202 may be approaching the curve 120 (i.e., obtaining the second trigger signal), the processor 248 may obtain the road information and the weather information from the transceiver 246. The processor 248 may then calculate an optimum vehicle 202 speed at which the vehicle 202 may navigate the curve 120, based on the road information and the weather information. The processor 248 may calculate the optimum vehicle 202 speed by using an exemplary process described below. The present disclosure is not limited to the exemplary process described below, and different methods/processes may be implemented to calculate the optimum vehicle 202 speed without departing from the present disclosure scope.

The processor 248 may determine whether the road 110 (specifically the curve 120) may have a presence of water or snow based on the obtained weather information. For example, if the weather information indicates that it has been raining or snowing in the geographical area including the road 110 for past 15 or 30 minutes, the processor 248 may determine that the road 110 may have the presence of water or snow. Further, the processor 248 may determine the road surface type (e.g., whether the road 110 may be made from concrete, asphalt, etc., or the road 110 may have a gravel surface or the road 110 may be an unsurfaced road) from the obtained road information. The processor 248 may then correlate the weather information with the road surface type, and determine a coefficient of friction for the road 110 based on the correlation.

In some aspects, the processor 248 may determine the coefficient of friction for the road 110 by fetching a mapping of a plurality of coefficients of friction relative to wet, dry or snow-covered road surfaces made of concrete, asphalt, gravel surface, and/or the like. In some aspects, the mapping of coefficients of friction with different road surfaces may be pre-stored in the memory 218, 250 or on the server(s) 220, and the processor 248 may fetch the mapping, via the transceiver 246, from the memory 218, 250 or the server(s) 220. The processor 248 may use the mapping to determine the coefficient of friction for the road 110 (specifically for the curve 120) based on the road surface type and the weather condition. In particular, the processor 248 may compare the correlation (associated with the weather information and the road surface type) with the mapping and determine the coefficient of friction for the road 110. For example, if the road 110 is made of asphalt and the weather information indicates dry road surface, the processor 248 may determine that the road 110 may have the coefficient of friction ("mu") of 0.7 based on the mapping. On the other hand, if the road 110 is made of asphalt and the weather information indicates wet road surface, the processor 248 may determine that the road 110 may have the coefficient of friction of 0.4 based on the mapping.

In addition to determining the coefficient of friction, the processor 248 may determine radius of curvature of the curve 120 from the obtained road information. The processor 248 may then use the coefficient of friction and curve 120 radius of curvature to calculate the optimum vehicle 202 speed. In particular, the optimum vehicle 202 speed may be a function of the coefficient of friction and the curve 120 radius of curvature. In an exemplary aspect, the processor 248 may calculate the optimum vehicle 202 speed based on the mathematical expression:

$$V < \sqrt{(mu * \text{radius} * \text{Gravitational Constant})}; \quad \text{Mathematical Model (1)}$$

where "V" may be the optimum vehicle 202 speed,
"mu" may be the determined coefficient of friction,
"radius" may be the curve 120 radius of curvature, and
the Gravitational Constant may have a value of 9.8 meters per second$^2$.

The mathematical model (1) is provided for illustrative purpose only and should not be construed as limiting. The processor 248 may use any other formula or logical approach and may calculate the optimum vehicle 202 speed based on the obtained road information and the weather information.

Responsive to calculating the optimum vehicle 202 speed, the processor 248 may transmit a first command signal to the wheel motor drive 242 to control wheel 115 torque based on the optimum vehicle 202 speed (either directly or via the VCU 206). Specifically, the processor 248 may send the first command signal to the wheel motor drive 242 to control wheel 115 speed such that vehicle 202 existing speed matches with the calculated optimum vehicle 202 speed. For example, if the vehicle 202 existing speed is 45 miles/hour and the optimum vehicle 202 speed for navigating the curve 120 is 30 miles/hour, the processor 248 may send the first command signal to the wheel motor drive 242 to reduce wheel 115 speed from 45 to 30 miles/hour. In some aspects, the first command signal may include the calculated optimum vehicle 202 speed.

Responsive to receiving the first command signal, the wheel motor drive 242 may control wheel 115 torque and automatically reduce vehicle 202 speed to the optimum vehicle 202 speed. In an exemplary aspect, the processor 248 may allow the vehicle operator to again increase vehicle 202 speed, when the vehicle 202 crosses the curve 120 (as determined by the real-time vehicle 202 geolocation).

In some aspects, along with controlling (e.g., reducing) the vehicle 202 speed when the vehicle 202 navigates the curve 120, the processor 248 may also control rotation angle of each wheel 115 so that the vehicle 202 may stably navigate the curve 120 (e.g., without skidding or crossing the lane on the road 110). Specifically, the processor 248 may calculate optimum rotation angle for each wheel 115 based on the road information (e.g., the curve 120 radius of curvature) and the vehicle information that the processor 248 may obtain from the memory 250. The vehicle information may include, for example, wheel 115 condition information, vehicle design and vehicle 202 weight. In some aspects, the processor 248 may calculate the optimum rotation angle for each wheel 115 such that each wheel 115 may have same or different rotation angle relative to rotation angles of other vehicle wheels. An example of different rotation angles for wheels 115 is depicted in FIG. 3.

Figure 3:
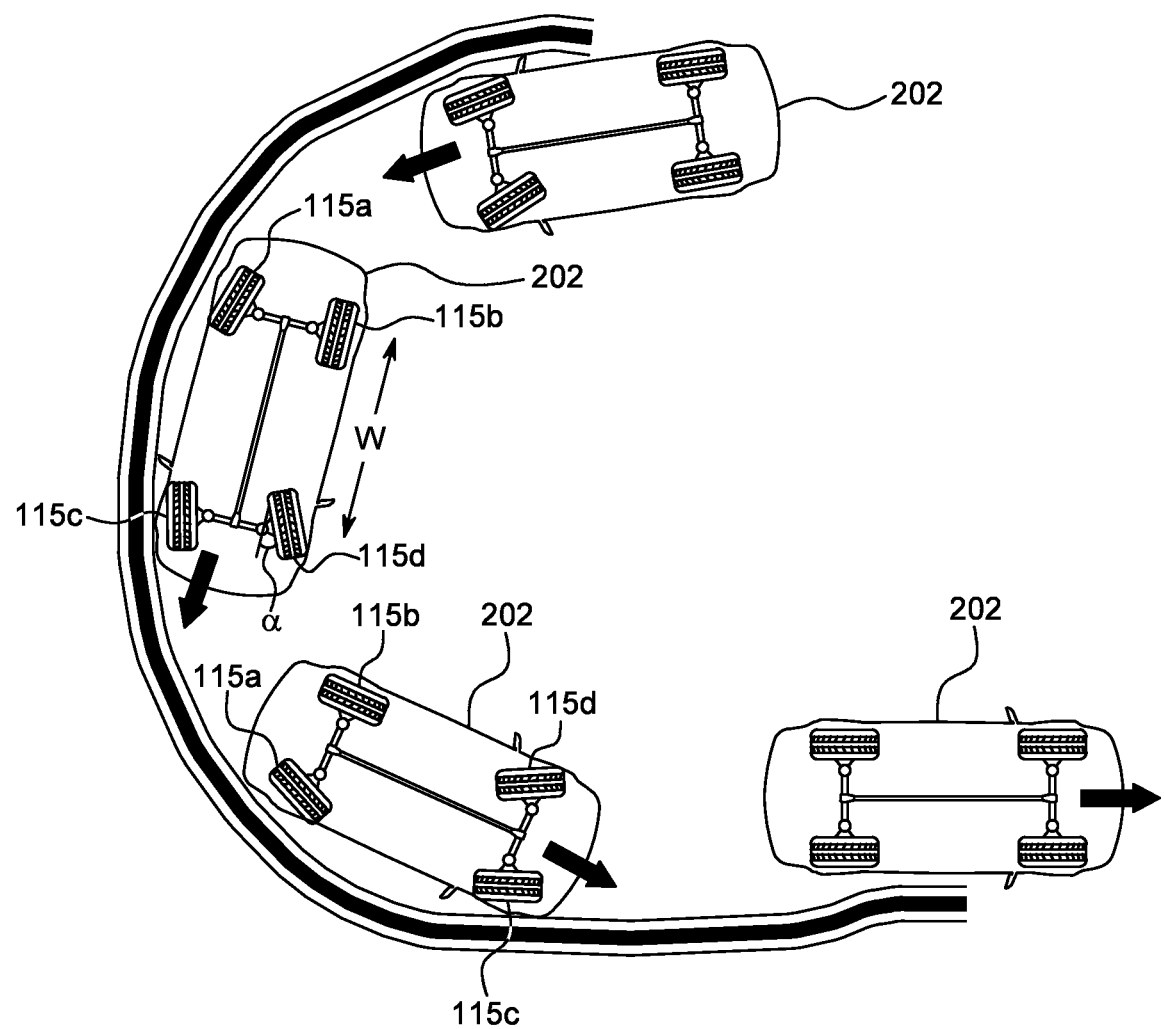
FIG. 3 illustrates an example embodiment of managing wheel rotation angle on a curvy road in accordance with the present disclosure.

Specifically, FIG. 3 illustrates an example embodiment of managing wheel 115 rotation angle on the curvy road 110 in accordance with the present disclosure. Different vehicle 202 wheels are depicted as a rear right wheel 115a, a rear left wheel 115b, a front right wheel 115c and a front left wheel 115d in FIG. 3. The processor 248 may calculate optimum rotation angle for each wheel 115a, 115b, 115c, 115d based on the curve 120 radius of curvature, wheel type, wheel condition, vehicle 202 weight, vehicle 202 design, etc. In an exemplary aspect, rotation angle of front wheels 115c, 115d may be calculated using the following mathematical model (2):

Mathematical Model (2)

$$\mathrm{Tan}(\alpha) = W/\mathrm{Radius};$$

where, "α" may be the rotation angle of the front wheel 115c and/or 115d relative to vehicle 202 longitudinal axis, "W" may be wheelbase (i.e., distance between the front wheels 115c, 115d and the rear wheels 115a, 115b), and "Radius" may be the curve 120 radius of curvature.

The mathematical model (2) is provided for illustrative purpose only and should not be construed as limiting.

In another exemplary aspect, depending on the radius of curvature (e.g., if the radius of curvature is less than a threshold value), the processor 248 may calculate an optimum rotation angle of the rear right wheel 115a such that the rear right wheel 115a may be rotated "outwards" (as shown in FIG. 3) relative to the rotation angles of the front wheels 115c, 115d. Stated another way, the rotation angle of the rear right wheel 115a may have an opposite polarity relative to rotation angle polarities of the front wheels 115c, 115d. In other aspects, the processor 248 may calculate optimum rotation angle for each wheel 115 based on wheel wear and tear, wheel design, vehicle 202 weight, etc. For example, optimum rotation angle of one or more wheels 115 may be less if the vehicle 202 weight is greater than a predefined weight threshold (that may be pre-stored in the memory 250), or if the wheel 115 may be worn due to wear and tear. The optimum rotation angle may be different for wheels with higher width as compared to rotation angles of wheels with relatively smaller widths.

Responsive to calculating optimum rotation angles for each wheel 115, the processor 248 may send a second command signal to the wheel steering actuator 244 (directly or indirectly via the VCU 206). The second command signal may include the calculated optimum rotation angle, and each wheel steering actuator 244 may receive a different second command signal based on the calculated optimum rotation angle for the respective wheel 115. For example, steering wheel actuator associated with the rear right wheel 115a may receive a different second command signal (and hence the optimum rotation angle) than the second command signal received by steering wheel actuator associated with the front left wheel 115d.

The wheel steering actuator 244 may cause wheel 115 rotation based on the received second command signal. In this manner, the processor 248 may control vehicle 202 speed and rotation angle of each wheel 115 when the vehicle 202 navigates the curve 120, thus enabling stable curve navigation. As described above, the processor 248 may enable the vehicle operator to modify vehicle 202 speed and/or rotation angle of each wheel 115 when the vehicle 202 crosses the curve 120. The processor 248 may again calculate optimum vehicle 202 speed and rotation angles for each wheel 115 when the vehicle 202 approaches another curve (e.g., the curve 125) on the road 110.

In additional aspects of the present disclosure, the processor 248 may transmit the obtained road information and weather information, and the calculated optimum vehicle speed and wheel rotation angle to the server 220 (e.g., cloud) for storage purpose. In further aspects, the processor 248 may store the obtained road information and weather information, and the calculated optimum vehicle speed and wheel rotation angle in the memory 250. When the processor 248 determines that the vehicle 202 may be navigating the same road 110 in similar weather condition, the processor 248 may use the stored vehicle speed and wheel rotation angle by using AI/ML algorithm (that may be pre-stored in the memory 250) to assist the vehicle 202 (or any other similar vehicle) in navigating the road 110. In this case, the processor 248 may determine that the vehicle 202 may be navigating the same road 110 based on the obtained road information and/or based on the historical vehicle driving or usage pattern (that may be part of the vehicle information) or vehicle geo-location. The processor 248 may determine that the weather condition may be same or different from weather conditions of earlier vehicle trips based on the obtained weather information.

In a scenario where the obtained weather condition may be different than the weather condition of earlier trips, the processor 248 may fetch the updated coefficient of friction associated with updated weather condition from the memory 218, 250, and may re-calculate the stored vehicle speed (and/or wheel rotation angle) based on the updated coefficient of friction.

Figure 4:
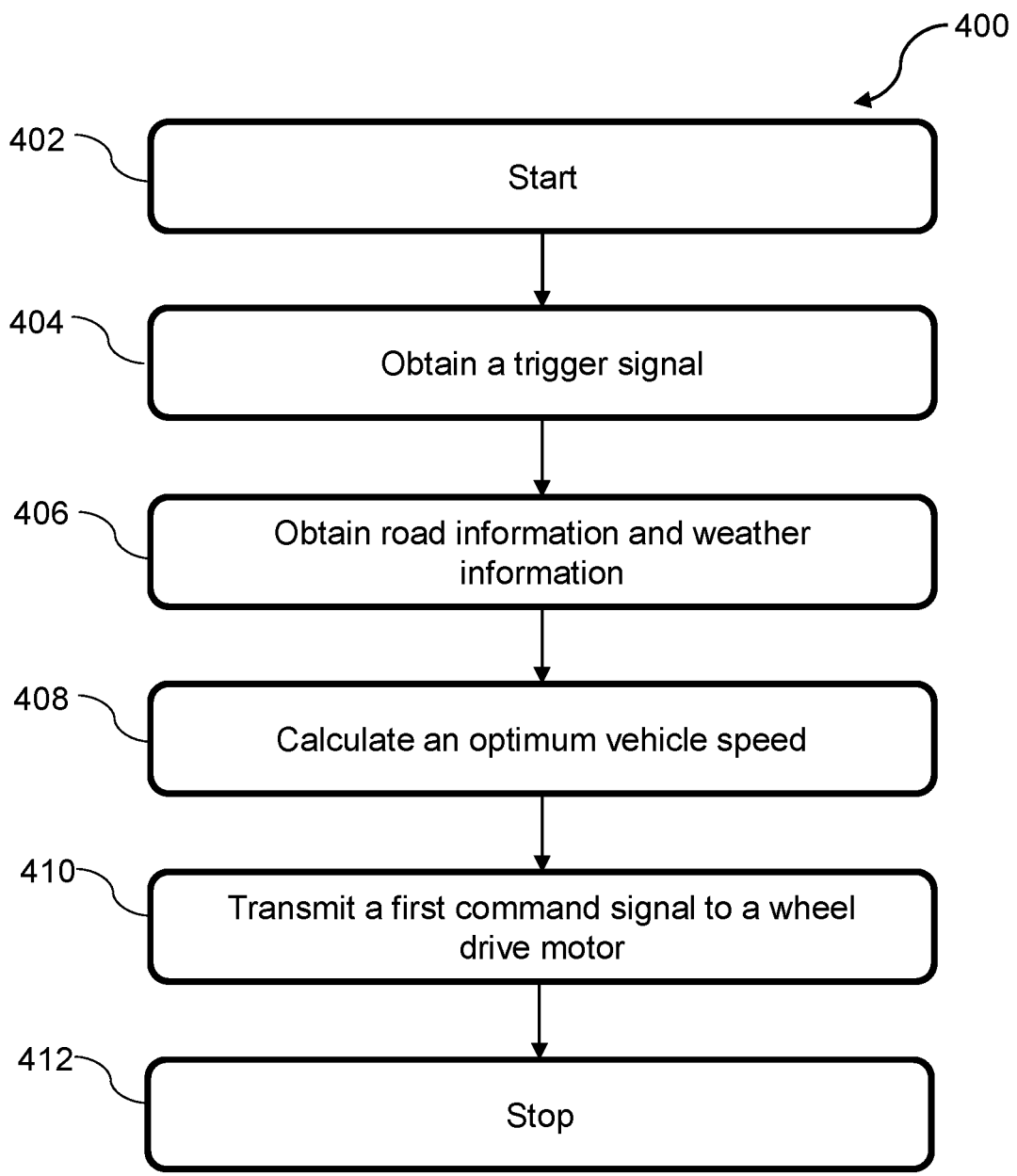
FIG. 4 depicts a flow diagram of an example first method for controlling vehicle movement on a curvy road in accordance with the present disclosure.

FIG. 4 depicts a flow diagram of an example first method 400 for controlling vehicle 202 movement on the curvy road 110 in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 600 may include obtaining, by the processor 248, a trigger signal when the vehicle 202 approaches the curvy road 110. At step 406, the method 400 may include obtaining, by the processor 248, the road information and the weather information as described above in conjunction with FIG. 2.

Responsive to obtaining the road information and the weather information, the processor 248 may calculate the optimum vehicle 202 speed based on the obtained information at step 408. At step 410, the method 400 may include transmitting, by the processor 248, the first command signal to the wheel drive motor 242 to control torque of wheel 115 based on the calculated optimum vehicle 202 speed.

The method 400 may end at step 412.

Figure 5:
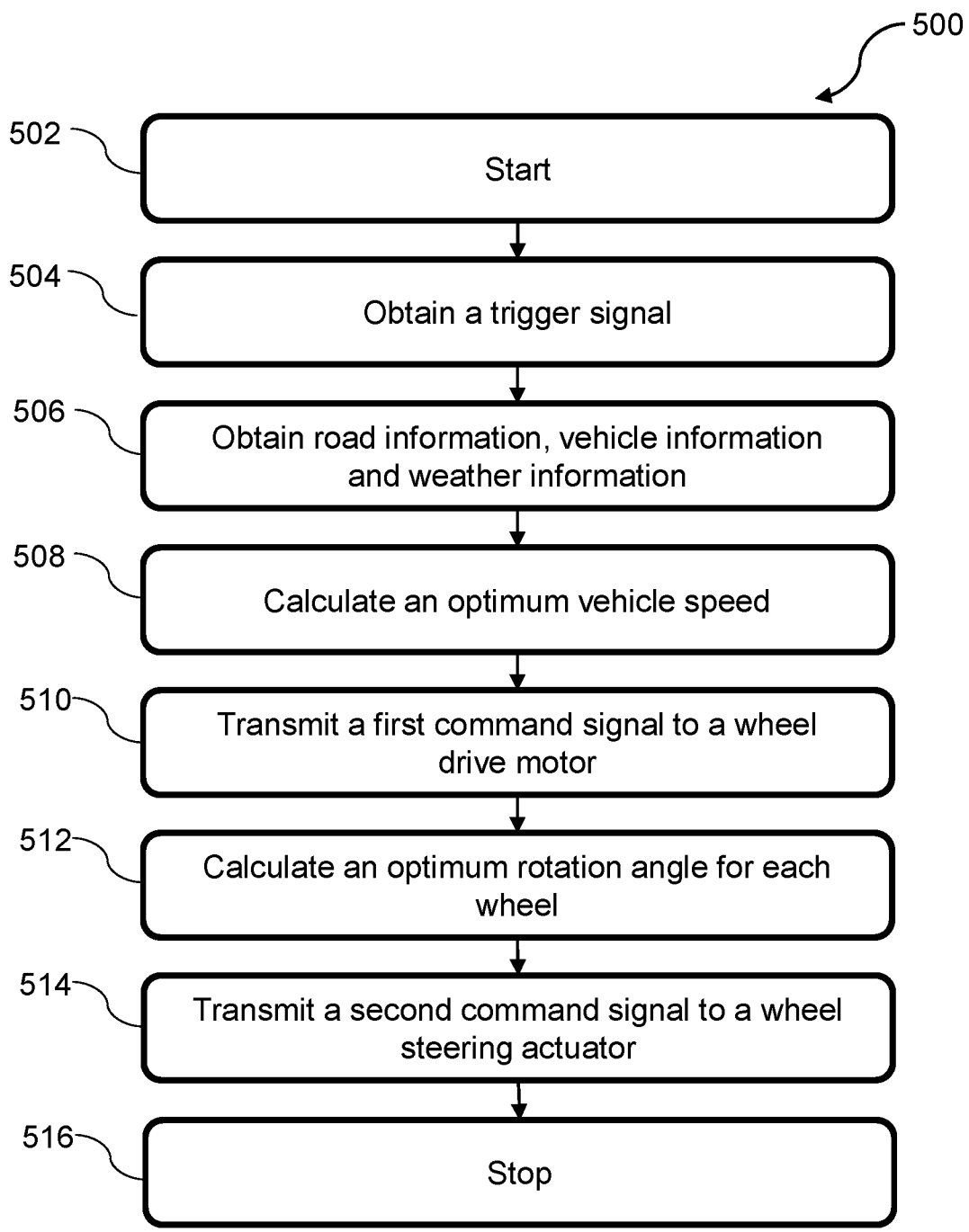
FIG. 5 depicts a flow diagram of an example second method for controlling vehicle movement on a curvy road in accordance with the present disclosure.

FIG. 5 depicts a flow diagram of an example second method 500 for controlling vehicle 202 movement on the curvy road 110 in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. Steps 504, 506, 508 and 510 may be same as the steps 404, 406, 408 and 410, and hence are not described again here for the sake of simplicity and conciseness. In some aspects, the step 506 may differ from the step 406 such that at the step 506, the processor 248 may obtain the vehicle 202 information, in addition to obtaining the road information and the weather information.

At step 512, the method 500 may include calculating, by the processor 248, the optimum rotation angle of each wheel 115 based on the obtained road information and the vehicle information. At step 514, the method 500 may include transmitting, by the processor 248, the second command signal to the wheel steering actuator 244 to control rotation angle of each wheel 115 based on the calculated optimum rotation angle.

At step 516, the method 500 may end.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
    a transceiver configured to receive road information and first weather information;
    a wheel drive motor configured to control torque of a vehicle wheel; and
    a processor communicatively coupled to the transceiver and the wheel drive motor, wherein the processor is configured to:
        obtain a first trigger signal when the vehicle approaches a curvy road at a first time;

obtain, responsive to obtaining the first trigger signal, the road information and the first weather information from the transceiver, wherein the road information comprises a radius of curvature of a curve on the curvy road;

calculate, based on the road information and the first weather information, a first vehicle speed at which to enter the curvy road;

transmit, based on the first vehicle speed, a first command signal to the wheel drive motor to control vehicle wheel torque;

store the first vehicle speed in memory;

in response to the vehicle approaching the curvy road at a second time after the first time, obtain second weather information;

determine whether the second weather information is different than the first weather information;

in response to determining that the second weather information is different than the first weather information, calculate a second vehicle speed at which to enter the curvy road using the second weather information;

in response to determining that the second weather information is not different than the first weather information, set the second vehicle speed as the first vehicle speed; and transmit, based on the second vehicle speed, a second command signal to the wheel drive motor to control vehicle wheel torque.

2. The vehicle of claim 1 further comprising:
a wheel steering actuator configured to rotate the vehicle wheel.

3. The vehicle of claim 2, wherein the processor is further configured to:
obtain vehicle information from the memory responsive to obtaining the first trigger signal;
calculate a wheel rotation angle based on the road information and the vehicle information; and
transmit a third command signal to the wheel steering actuator to rotate the vehicle wheel based on the wheel rotation angle.

4. The vehicle of claim 3, wherein the vehicle information comprises vehicle weight, vehicle wheel condition information, and vehicle structure information.

5. The vehicle of claim 1, wherein the processor obtains the first trigger signal from a Global Positioning System (GPS) server.

6. The vehicle of claim 1, wherein the road information further comprises a road surface type.

7. The vehicle of claim 6, wherein the processor is further configured to:
obtain a coefficient of friction of the curvy road based on the road surface type and the first weather information; and
calculate the first vehicle speed based on the coefficient of friction.

8. The vehicle of claim 1, wherein the transceiver receives the road information and the first weather information from a server.

9. A method to control movement of a vehicle on a curvy road, the method comprising:
obtaining, by a processor, a first trigger signal when the vehicle approaches the curvy road at a first time;
obtaining, by the processor, road information and first weather information responsive to obtaining the first trigger signal, wherein the road information comprises a radius of curvature of a curve on the curvy road;
calculating, by the processor, a first vehicle speed at which to enter the curvy road based on the road information and the first weather information;
transmitting, by the processor, a first command signal to a wheel drive motor of the vehicle to control vehicle wheel torque based on the first vehicle speed;
storing the first vehicle speed in memory;
in response to the vehicle approaching the curvy road at a second time after the first time, obtaining second weather information;
determining whether the second weather information is different than the first weather information;
in response to determining that the second weather information is different than the first weather information, calculating a second vehicle speed at which to enter the curvy road using the second weather information;
in response to determining that the second weather information is not different than the first weather information, setting the second vehicle speed as the first vehicle speed; and
transmitting, based on the second vehicle speed, a second command signal to the wheel drive motor to control vehicle wheel torque.

10. The method of claim 9 further comprising:
obtaining vehicle information responsive to obtaining the first trigger signal;
calculating a wheel rotation angle based on the road information and the vehicle information; and
transmitting a third command signal to a wheel steering actuator of the vehicle to rotate a vehicle wheel based on the wheel rotation angle.

11. The method of claim 10, wherein the vehicle information comprises vehicle weight, vehicle wheel condition information, and vehicle structure information.

12. The method of claim 9, wherein the first trigger signal is obtained from a Global Positioning System (GPS) server.

13. The method of claim 9, wherein the road information further comprises a road surface type.

14. The method of claim 13 further comprising:
obtaining a coefficient of friction of the curvy road based on the road surface type and the first weather information; and
calculating the first vehicle speed based on the coefficient of friction.

15. The method of claim 9, wherein obtaining the road information and the first weather information comprises obtaining the road information and the first weather information from a server.

16. A non-transitory computer-readable storage medium having instructions stored thereupon which, when executed by a processor, cause the processor to:
obtain a first trigger signal when a vehicle approaches a curvy road at a first time;
obtain road information and first weather information responsive to obtaining the first trigger signal, wherein the road information comprises a radius of curvature of a curve on the curvy road;
calculate a first vehicle speed at which to enter the curvy road based on the road information and the first weather information;
transmit a first command signal to a wheel drive motor of the vehicle to control vehicle wheel torque based on the first vehicle speed;
store the first vehicle speed in memory;
in response to the vehicle approaching the curvy road at a second time after the first time, obtain second weather information;

determine whether the second weather information is different than the first weather information;

in response to determining that the second weather information is different than the first weather information, calculate a second vehicle speed at which to enter the curvy road using the second weather information;

in response to determining that the second weather information is not different than the first weather information, set the second vehicle speed as the first vehicle speed; and transmit, based on the second vehicle speed, a second command signal to the wheel drive motor to control vehicle wheel torque.

17. The non-transitory computer-readable storage medium of claim 16, having further instructions stored thereupon to:

obtain vehicle information responsive to obtaining the first trigger signal;

calculate a wheel rotation angle based on the road information and the vehicle information; and transmit a third command signal to a wheel steering actuator of the vehicle to rotate a vehicle wheel based on the wheel rotation angle.

18. The non-transitory computer-readable storage medium of claim 17, wherein the vehicle information comprises vehicle weight, vehicle wheel condition information, and vehicle structure information.

19. The non-transitory computer-readable storage medium of claim 16, wherein the road information further comprises a road surface type.

20. The non-transitory computer-readable storage medium of claim 19, having further instructions stored thereupon to:

obtain a coefficient of friction of the curvy road based on the road surface type and the first weather information; and calculate the first vehicle speed based on the coefficient of friction.

* * * * *